(12) United States Patent
Venkatanarayanan et al.

(10) Patent No.: US 11,513,731 B2
(45) Date of Patent: Nov. 29, 2022

(54) SYSTEM AND METHOD FOR NON-DISRUPTIVE STORAGE PROTOCOL CONVERSION

(71) Applicant: EMC IP Holding Company, LLC, Hopkinton, MA (US)

(72) Inventors: Prakash Venkatanarayanan, Bangalore (IN); Amihay Azruel, Raanana (IL); Sreenivasa Honnur Sathyanarayana, Bangalore (IN); Md Haris Iqbal, Bangalore (IN); Kundan Kumar, Bangalore (IN); Matthew Long, Uxbridge, MA (US); Jean Marie Schiff, Bolton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 169 days.

(21) Appl. No.: 16/914,651

(22) Filed: Jun. 29, 2020

(65) Prior Publication Data
US 2021/0405921 A1 Dec. 30, 2021

(51) Int. Cl.
*G06F 3/06* (2006.01)
*G06F 13/40* (2006.01)

(52) U.S. Cl.
CPC ............ *G06F 3/0659* (2013.01); *G06F 3/061* (2013.01); *G06F 3/0679* (2013.01); *G06F 3/0688* (2013.01); *G06F 13/4022* (2013.01)

(58) Field of Classification Search
CPC .... G06F 3/0607; G06F 3/0659; G06F 3/0661; G06F 3/0665; G06F 3/0656;
(Continued)

(56) References Cited

U.S. PATENT DOCUMENTS

| 8,819,374 B1 * | 8/2014 | Don | G06F 3/0607 |
| | | | 711/165 |
| 2007/0088702 A1* | 4/2007 | Fridella | G06F 16/166 |

(Continued)

OTHER PUBLICATIONS

NVM Express, "NVM Express Base Specification Revision 1.4a;" Mar. 9, 2020, https://nvmexpress.org/wp-content/uploads/NVM-Express-1_4a-2020.03.09-Ratified.pdf (Year: 2020).*

(Continued)

*Primary Examiner* — John A Follansbee
*Assistant Examiner* — Lam T Do
(74) *Attorney, Agent, or Firm* — Brian J. Colandreo; Mark H. Whittenberger; Holland & Knight LLP

(57) ABSTRACT

A method, computer program product, and computing system for selecting target volumes within a storage system that are currently accessible to computing devices via first storage protocol paths via a first storage protocol for accessing via second storage protocol paths via a second storage protocol. For each of the selected target volumes, a first storage protocol identifier specific to each selected target volume may be associated with a second storage protocol identifier specific to each selected target volume. The first storage protocol paths and the second storage protocol paths may be grouped into a multipath group based upon the association between the first storage protocol identifier and the second storage protocol identifier. Access between the computing devices and the selected target volumes may be switched from the first storage protocol paths to the second storage protocol paths without application disruption and across multiple host platforms, including host-clusters.

15 Claims, 6 Drawing Sheets

(58) Field of Classification Search
CPC ............... G06F 3/0689; G06F 13/1668; G06F 13/4021; G06F 13/4027; G06F 13/4234; G06F 2213/0024; G06F 2213/0036; G06F 2213/3852; G06F 710/04
See application file for complete search history.

(56) References Cited

U.S. PATENT DOCUMENTS

2011/0153905 A1* 6/2011 Otani .................... G06F 3/0607
 710/316
2020/0225863 A1* 7/2020 Veluswamy ............ G06F 3/061
2020/0233584 A1* 7/2020 Yang ..................... G06F 3/0656

OTHER PUBLICATIONS

NVM Express Workgroup, "NVM Express: SCSI Translation Reference Revision 1.5" Jun. 24, 2015, https://nvmexpress.org/wp-content/uploads/NVM_Express_-_SCSI_Translation_Reference-1_5_20150624_Gold.pdf (Year: 2015).*

* cited by examiner

SYSTEM AND METHOD FOR NON-DISRUPTIVE STORAGE PROTOCOL CONVERSION

BACKGROUND

Storing and safeguarding electronic content may be beneficial in modern business and elsewhere. Accordingly, various methodologies may be employed to protect and distribute such electronic content.

As storage systems advance with new storage technologies and protocols, migration of customer data from one storage system to another remains a constant challenge. However, existing procedures for converting from one storage protocol to another are totally disruptive as they involve bringing down host applications, reconfiguring storage protocol paths, and restarting the host applications. This disruptive procedure may not be acceptable in many scenarios.

SUMMARY OF DISCLOSURE

In one example implementation, a computer-implemented method executed on a computing device may include, but is not limited to, selecting one or more target volumes within a storage system that are currently accessible to one or more computing devices via one or more first storage protocol paths via a first storage protocol for accessing via one or more second storage protocol paths via a second storage protocol. For each of the one or more selected target volumes, a first storage protocol identifier specific to each selected target volume may be associated with a second storage protocol identifier specific to each selected target volume. The one or more first storage protocol paths and the one or more second storage protocol paths may be grouped into a multipath group based upon, at least in part, the association between the first storage protocol identifier and the second storage protocol identifier. Access between the computing devices and the selected target volumes may be switched from the first storage protocol paths to the second storage protocol paths.

One or more of the following example features may be included. The first storage protocol may be Small Computer System Interface (SCSI) and the second storage protocol may be Non-Volatile Memory Express (NVMe). Associating, for each of the one or more selected target volumes, a first storage protocol identifier specific to each selected target volume with a second storage protocol identifier specific to each selected target volume may include performing a NVMe set feature command on each second storage protocol identifier specific to each selected target volume. Grouping the one or more first storage protocol paths and the one or more second storage protocol paths into a multipath group based upon, at least in part, the association between the first storage protocol identifier and the second storage protocol identifier may include performing a NVMe get feature command on each second storage protocol identifier visible to the one or more computing devices; determining whether each second storage protocol identifier visible to the one or more computing devices is associated with a first storage protocol identifier; and grouping the one or more first storage protocol paths and the one or more second storage protocol paths into the multipath group in response to determining that the first storage protocol identifier specific to each selected target volume is associated with the second storage protocol identifier specific to each selected target volume. Grouping the one or more first storage protocol paths and the one or more second storage protocol paths into a multipath group based upon, at least in part, the association between the first storage protocol identifier and the second storage protocol identifier may include performing, on each second storage protocol identifier, a NVMe identify command configured to return the first storage protocol identifier specific to each selected target volume. Data may be migrated from the one or more selected target volumes to one or more destination volumes that are accessible to the one or more computing devices via the one or more second storage protocol paths. Switching access between the one or more computing devices and the one or more selected target volumes from the one or more first storage protocol paths to the one or more second storage protocol paths may include switching access between the one or more computing devices and the one or more selected target volumes via the one or more first storage protocol paths to access between the one or more computing devices and the one or more destination volumes via the one or more second storage protocol paths.

In another example implementation, a computer program product resides on a computer readable medium that has a plurality of instructions stored on it. When executed by a processor, the instructions cause the processor to perform operations that may include, but are not limited to, selecting one or more target volumes within a storage system that are currently accessible to one or more computing devices via one or more first storage protocol paths via a first storage protocol for accessing via one or more second storage protocol paths via a second storage protocol. For each of the one or more selected target volumes, a first storage protocol identifier specific to each selected target volume may be associated with a second storage protocol identifier specific to each selected target volume. The one or more first storage protocol paths and the one or more second storage protocol paths may be grouped into a multipath group based upon, at least in part, the association between the first storage protocol identifier and the second storage protocol identifier. Access between the computing devices and the selected target volumes may be switched from the first storage protocol paths to the second storage protocol paths.

One or more of the following example features may be included. The first storage protocol may be Small Computer System Interface (SCSI) and the second storage protocol may be Non-Volatile Memory Express (NVMe). Associating, for each of the one or more selected target volumes, a first storage protocol identifier specific to each selected target volume with a second storage protocol identifier specific to each selected target volume may include performing a NVMe set feature command on each second storage protocol identifier specific to each selected target volume. Grouping the one or more first storage protocol paths and the one or more second storage protocol paths into a multipath group based upon, at least in part, the association between the first storage protocol identifier and the second storage protocol identifier may include performing a NVMe get feature command on each second storage protocol identifier visible to the one or more computing devices; determining whether each second storage protocol identifier visible to the one or more computing devices is associated with a first storage protocol identifier; and grouping the one or more first storage protocol paths and the one or more second storage protocol paths into the multipath group in response to determining that the first storage protocol identifier specific to each selected target volume is associated with the second storage protocol identifier specific to each selected target volume.

Grouping the one or more first storage protocol paths and the one or more second storage protocol paths into a multipath group based upon, at least in part, the association between the first storage protocol identifier and the second storage protocol identifier may include performing, on each second storage protocol identifier, a NVMe identify command configured to return the first storage protocol identifier specific to each selected target volume. Data may be migrated from the one or more selected target volumes to one or more destination volumes that are accessible to the one or more computing devices via the one or more second storage protocol paths. Switching access between the one or more computing devices and the one or more selected target volumes from the one or more first storage protocol paths to the one or more second storage protocol paths may include switching access between the one or more computing devices and the one or more selected target volumes via the one or more first storage protocol paths to access between the one or more computing devices and the one or more destination volumes via the one or more second storage protocol paths.

In another example implementation, a computing system includes at least one processor and at least one memory architecture coupled with the at least one processor, wherein the at least one processor is configured to select one or more target volumes within a storage system that are currently accessible to one or more computing devices via one or more first storage protocol paths via a first storage protocol for accessing via one or more second storage protocol paths via a second storage protocol. The at least one processor may be further configured to associate, for each of the one or more selected target volumes, a first storage protocol identifier specific to each selected target volume with a second storage protocol identifier specific to each selected target volume. The at least one processor may be further configured to group the one or more first storage protocol paths and the one or more second storage protocol paths into a multipath group based upon, at least in part, the association between the first storage protocol identifier and the second storage protocol identifier. The at least one processor may be further configured to switch access between the one or more computing devices and the one or more selected target volumes from the one or more first storage protocol paths to the one or more second storage protocol paths.

One or more of the following example features may be included. The first storage protocol may be Small Computer System Interface (SCSI) and the second storage protocol may be Non-Volatile Memory Express (NVMe). Associating, for each of the one or more selected target volumes, a first storage protocol identifier specific to each selected target volume with a second storage protocol identifier specific to each selected target volume may include performing a NVMe set feature command on each second storage protocol identifier specific to each selected target volume. Grouping the one or more first storage protocol paths and the one or more second storage protocol paths into a multipath group based upon, at least in part, the association between the first storage protocol identifier and the second storage protocol identifier may include performing a NVMe get feature command on each second storage protocol identifier visible to the one or more computing devices; determining whether each second storage protocol identifier visible to the one or more computing devices is associated with a first storage protocol identifier; and grouping the one or more first storage protocol paths and the one or more second storage protocol paths into the multipath group in response to determining that the first storage protocol identifier specific to each selected target volume is associated with the second storage protocol identifier specific to each selected target volume.

Grouping the one or more first storage protocol paths and the one or more second storage protocol paths into a multipath group based upon, at least in part, the association between the first storage protocol identifier and the second storage protocol identifier may include performing, on each second storage protocol identifier, a NVMe identify command configured to return the first storage protocol identifier specific to each selected target volume. Data may be migrated from the one or more selected target volumes to one or more destination volumes that are accessible to the one or more computing devices via the one or more second storage protocol paths. Switching access between the one or more computing devices and the one or more selected target volumes from the one or more first storage protocol paths to the one or more second storage protocol paths may include switching access between the one or more computing devices and the one or more selected target volumes via the one or more first storage protocol paths to access between the one or more computing devices and the one or more destination volumes via the one or more second storage protocol paths.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
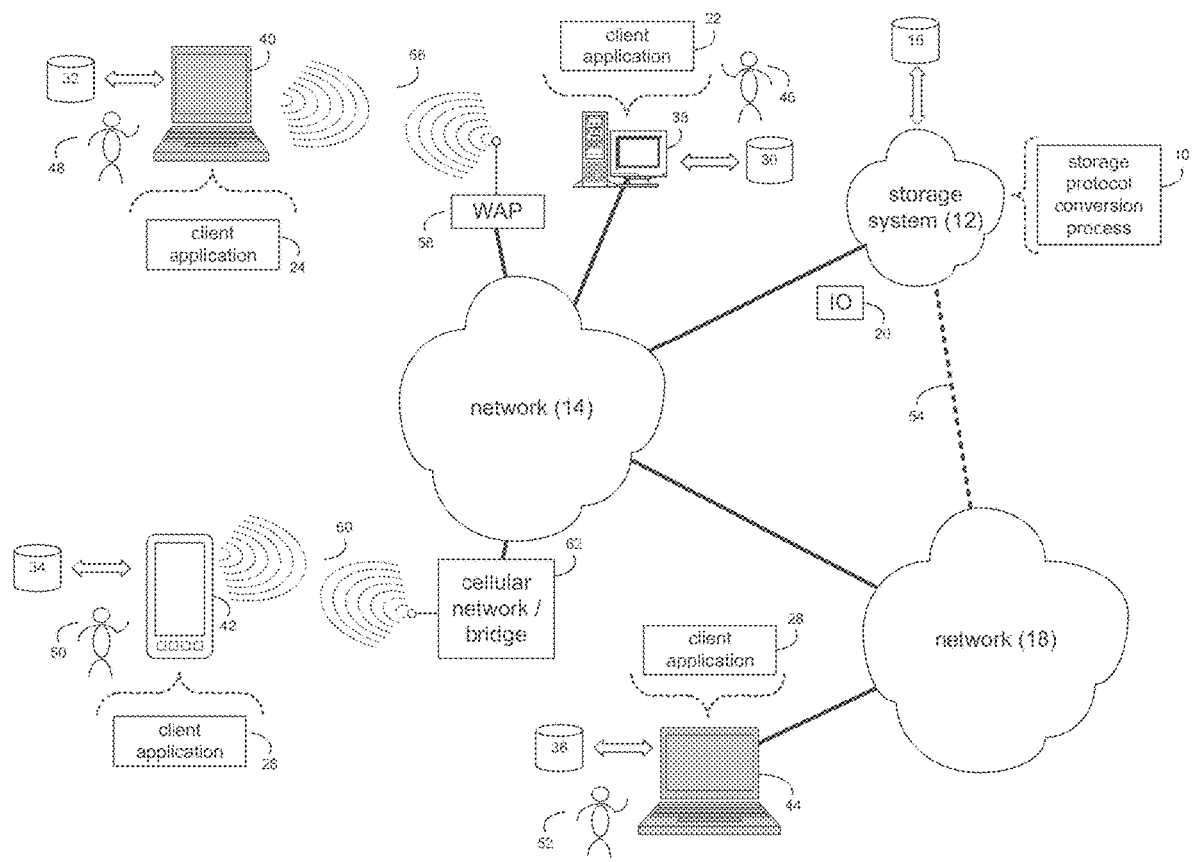
FIG. 1 is an example diagrammatic view of a storage system and a storage protocol conversion process coupled to a distributed computing network according to one or more example implementations of the disclosure.

System Overview:

Referring to FIG. 1, there is shown storage protocol conversion process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage protocol conversion process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage protocol conversion process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage protocol conversion process, such as storage protocol conversion process 10 of FIG. 1, may include but is not limited to, selecting one or more target volumes within a storage system that are currently accessible to one or more computing devices via one or more first storage protocol paths via a first storage protocol for accessing via one or more second storage protocol paths via a second storage protocol. For each of the one or more selected target volumes, a first storage protocol identifier specific to each selected target volume may be associated with a second storage protocol identifier specific to each selected target volume. The one or more first storage protocol paths and the one or more second storage protocol paths may be grouped into a multipath group based upon, at least in part, the association between the first storage protocol identifier and the second storage protocol identifier. Access between the computing devices and the selected target volumes may be switched from the first storage protocol paths to the second storage protocol paths.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
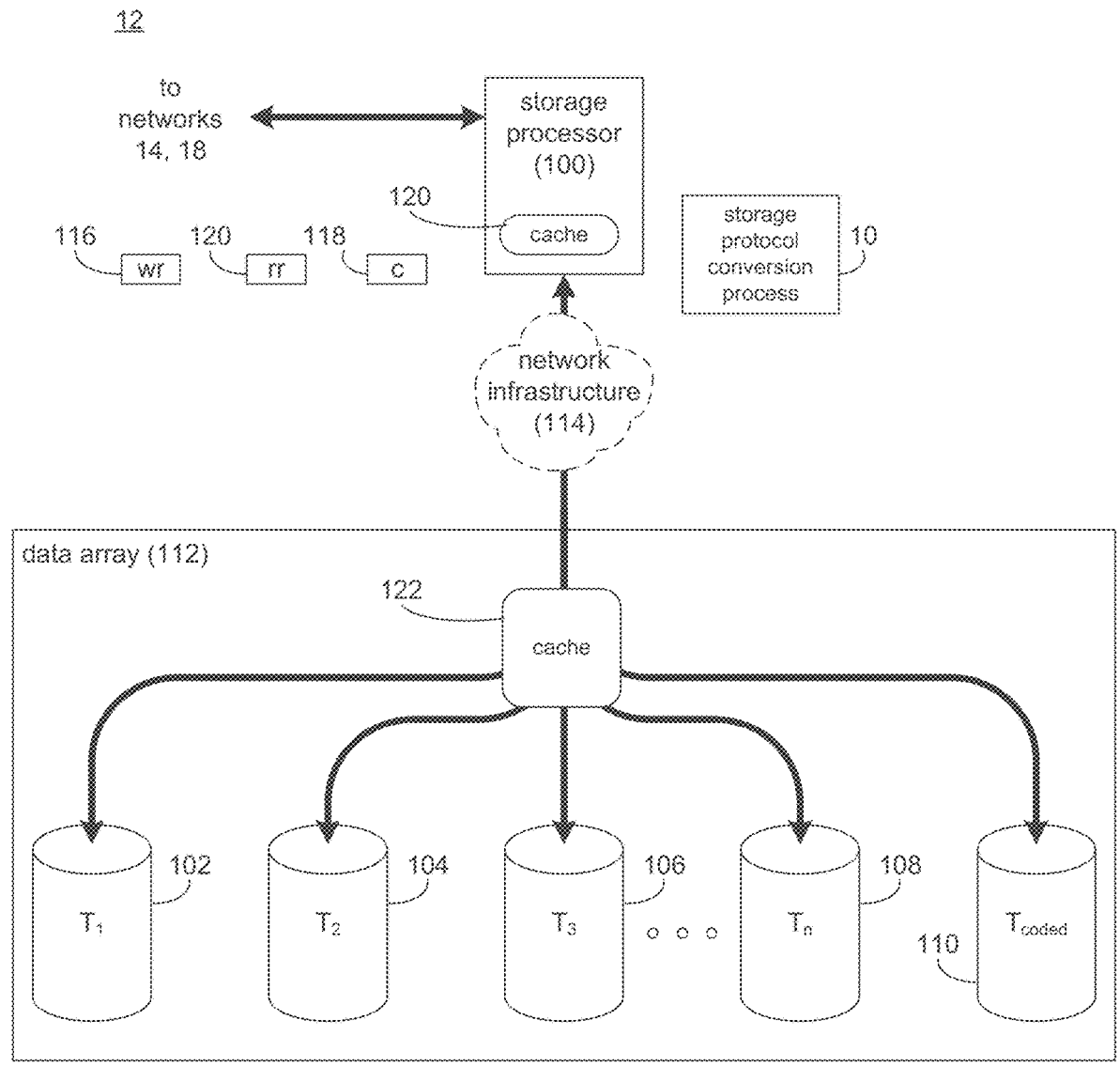
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of storage protocol conversion process 10. The instruction sets and subroutines of storage protocol conversion process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage protocol conversion process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of storage protocol conversion process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage protocol conversion process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
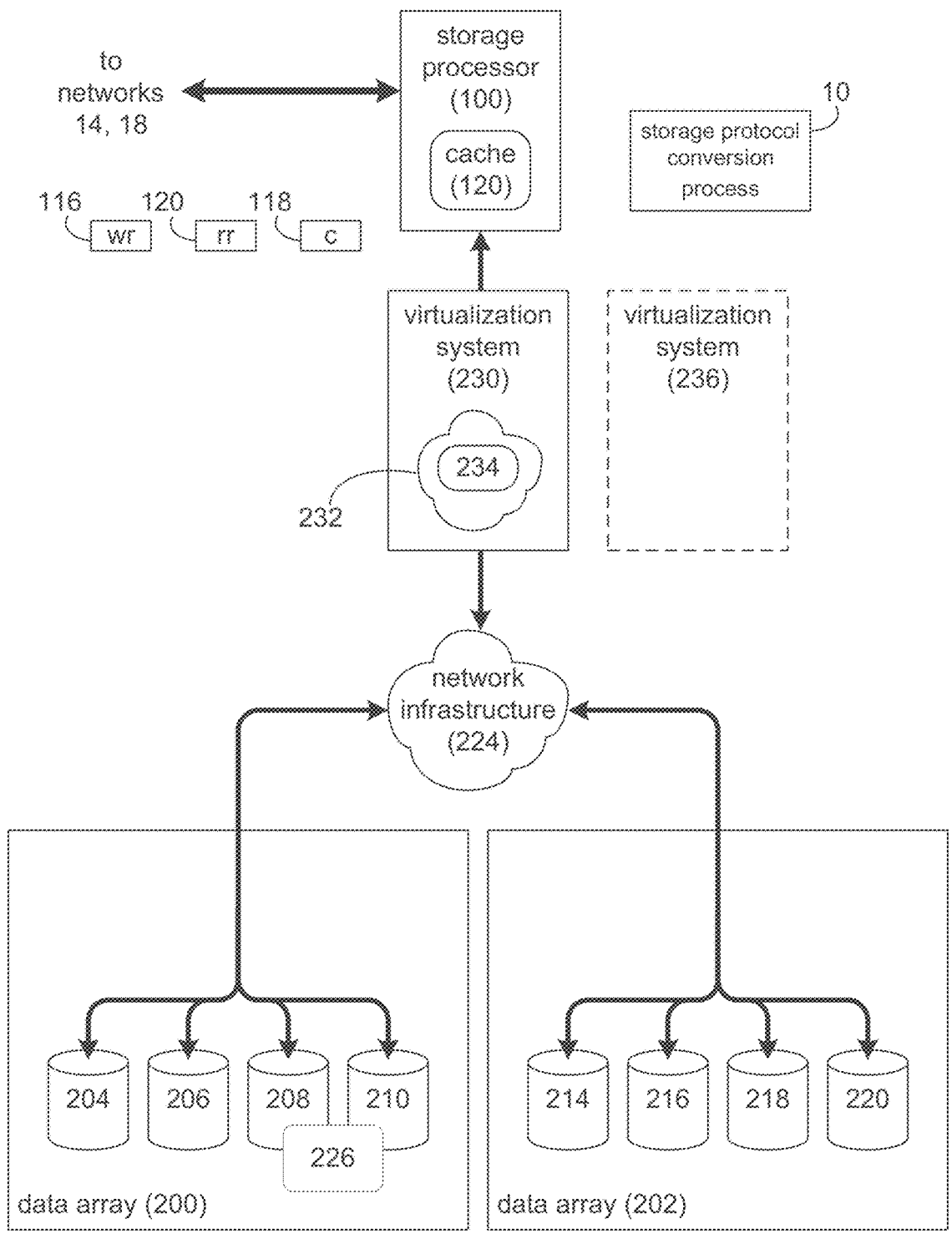

Referring also to FIG. 3, there is shown another implementation of storage system 12 that includes two separate and distinct data arrays (e.g., data arrays 200, 202). For illustrative purposes only, the first data array (e.g., data array 200) is shown to include four storage targets (e.g., storage targets 204, 206, 208, 210) and backend cache memory system 212. Further, the second data array (e.g., data array 202) is shown to include four storage targets (e.g., storage targets 214, 216, 218, 220) and backend cache memory system 222. Storage processor 100, data array 200 and data array 202 may be coupled using network infrastructure 224, examples of which may include but are not limited to an Ethernet (e.g., Layer 2 or Layer 3) network, a fiber channel network, an InfiniB and network, or any other circuit switched/packet switched network.

For the following example, assume that data arrays 200, 202 may include functionality that may be configured to define and expose one or more logical units that users of storage processor 100 may use and access to store data. Specifically, assume that data array 200 defines and exposes LUN 226 that may allow for the storage of data within data array 200.

Further and as discussed above, during the operation of data array 200, content (e.g., content 118) to be written to data array 200 may be received from storage processor 100 and initially stored within backend cache memory system 212 prior to being stored on e.g. one or more of storage targets 204, 206, 208, 210. Accordingly, during use of data array 200 and LUN 226, backend cache memory system 212 may be populated (i.e., warmed) and, therefore, subsequent read requests made to LUN 226 may be satisfied by backend cache memory system 212 (i.e., if the content requested in the read request is present within backend cache memory system 212), thus avoiding the need to obtain the content from storage targets 204, 206, 208, 210 (which would typically be slower).

Assume for the following example that LUN 226 needs to be migrated from data array 200 to data array 202, which may be required for various reasons (e.g., maintenance of data array 200, one or more components of data array 200 being decommissioned, one or more components of data array 200 being sold/coming off lease or load balancing between data arrays).

Figure 4:
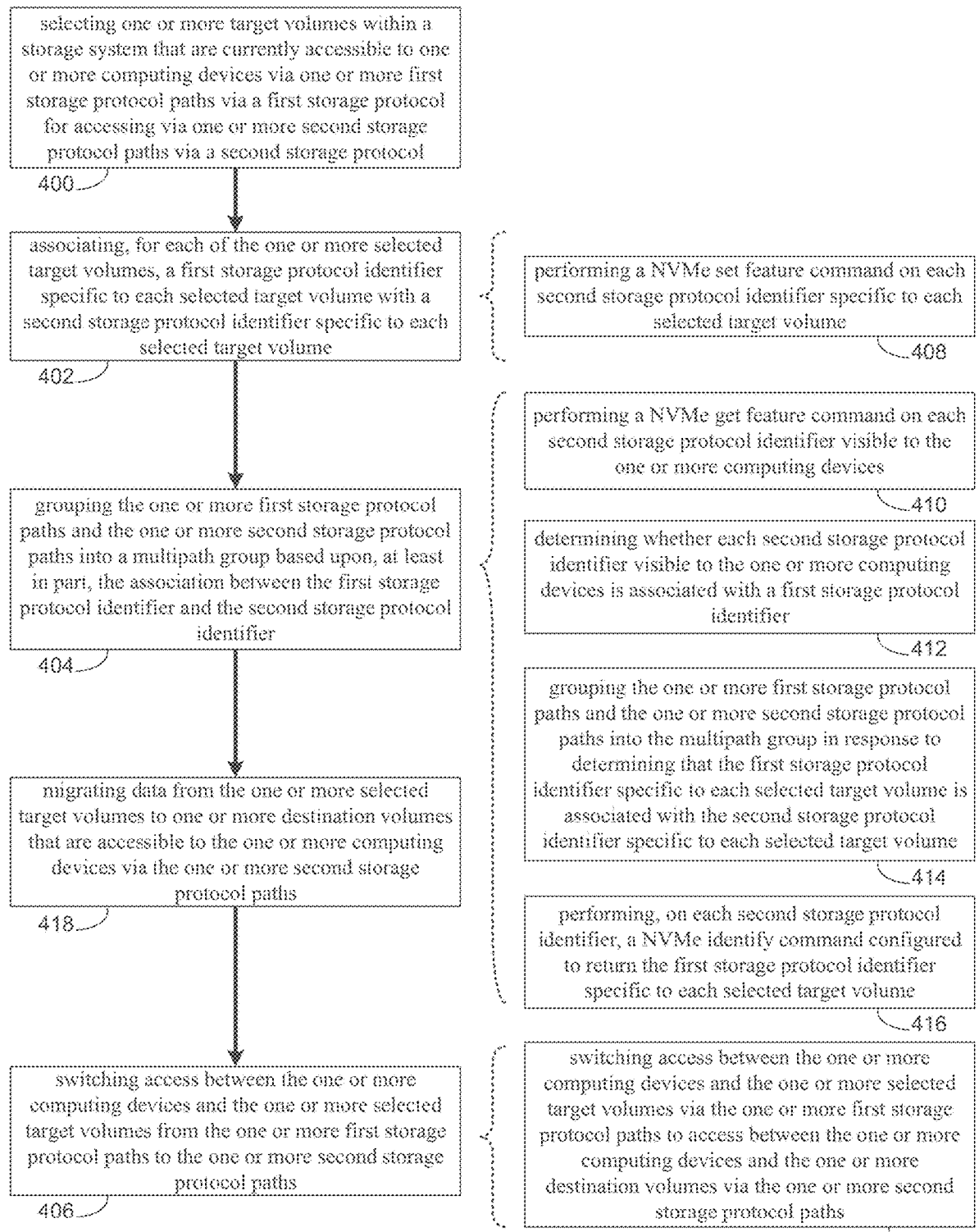
FIG. 4 is an example flowchart of storage protocol conversion process according to one or more example implementations of the disclosure.
Figure 5:
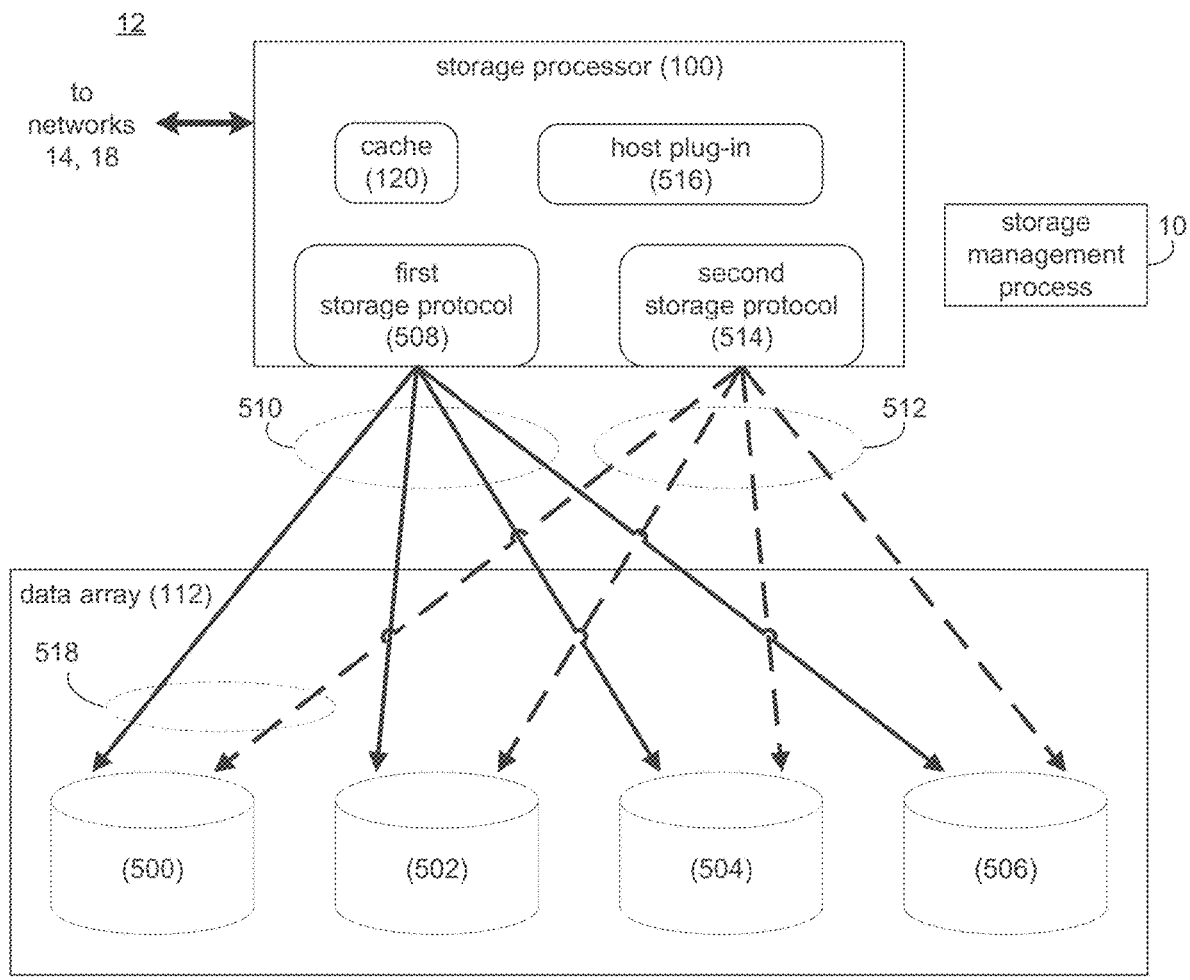
FIGS. 5-6 are example diagrammatic views of the storage system of FIG. 1 according to one or more example implementations of the disclosure.
Figure 6:
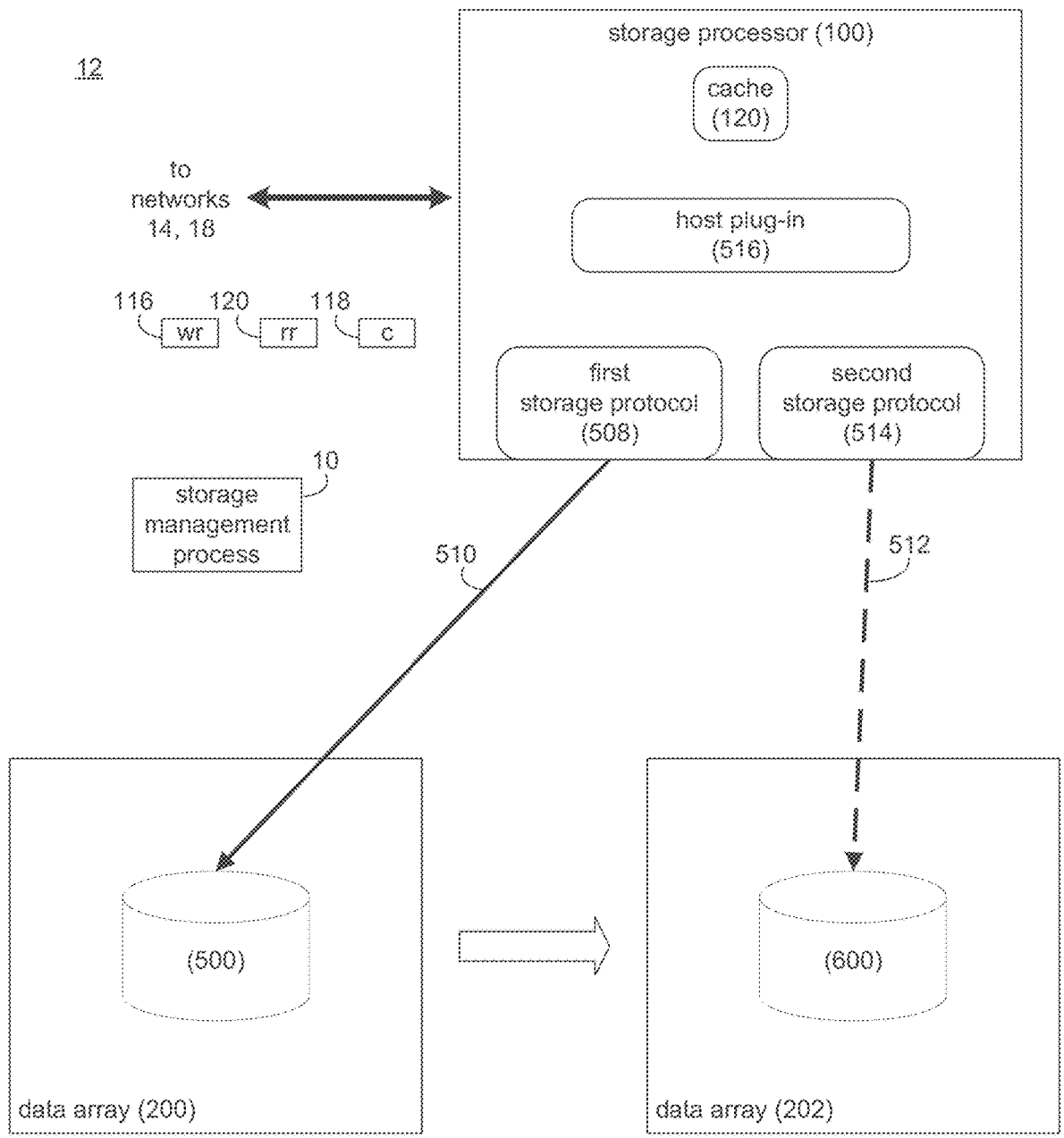

The Storage Protocol Conversion Process:

Referring also to the examples of FIGS. 4-6 and in some implementations, storage protocol conversion process 10 may select 400 one or more target volumes within a storage system that are currently accessible to one or more computing devices via one or more first storage protocol paths via a first storage protocol for accessing via one or more second storage protocol paths via a second storage protocol. For each of the one or more selected target volumes, a first storage protocol identifier specific to each selected target volume may be associated 402 with a second storage protocol identifier specific to each selected target volume. The one or more first storage protocol paths and the one or more second storage protocol paths may be grouped 404 into a multipath group based upon, at least in part, the association between the first storage protocol identifier and the second storage protocol identifier. Access between the one or more computing devices and the one or more selected target volumes may be switched 406 from the one or more first storage protocol paths to the one or more second storage protocol paths.

As will be discussed in greater detail below, implementations of the present disclosure may allow for a non-disruptive storage protocol conversion. Conventional approaches for converting from one storage protocol to another are totally disruptive as they involve bringing down the application using the first storage protocol, reconfiguring the access path from the first storage protocol to a second storage protocol, and restarting the application using the second storage protocol.

In some implementations, storage protocol conversion process 10 may select 400 one or more target volumes within a storage system that are currently accessible to one or more computing devices via one or more first storage protocol paths via a first storage protocol, for accessing via one or more second storage protocol paths via a second storage protocol. Referring also to the example of FIG. 5 and in some implementations, a storage processor (e.g., storage processor 100) may allow client electronic devices (e.g., client electronic devices 38, 40, 42, 44) to access one or more volumes (e.g., volumes 500, 502, 504, 506) within a data array (e.g., data array 112) via a first storage protocol (e.g., first storage protocol 508). For example, the storage processor (e.g., storage processor 100) may access the one or more volumes (e.g., volumes 500, 502, 504, 506) via one or more first storage protocol paths (e.g., first storage protocol paths 510) of the first storage protocol (e.g., first storage protocol 508). As will be discussed in greater detail below, a storage protocol may generally include standards or protocols for physically connecting and transferring data between computing devices and peripheral devices. In some implementations, a storage protocol path may generally include a hardware and/or software communication link between a computing devices and peripheral devices.

As will be discussed in greater detail below, storage protocol conversion process 10 may allow a storage processor (e.g., storage processor 100) to switch access to the one or more volumes (e.g., volumes 500, 502, 504, 506) from the one or more first storage protocol paths (e.g., first storage protocol paths 510) of a first storage protocol (e.g., first storage protocol 508) to one or more second storage protocol paths (e.g., second storage protocol paths 512) of a second storage protocol (e.g., second storage protocol 514).

In some implementations, the first storage protocol may be Small Computer System Interface (SCSI) and the second storage protocol may be Non-Volatile Memory Express (NVMe). As is known in the art, SCSI is a set of standards for physically connecting and transferring data between computers and peripheral devices with standards that define commands and protocols for electrical, optical, and logical interfaces. In some implementations, storage protocol conversion process 10 may allow a storage processor (e.g., storage processor 100) to switch access to the one or more volumes (e.g., volumes 500, 502, 504, 506) from one or more first storage protocol paths (e.g., first storage protocol path 510) using the SCSI protocol to one or more second storage protocol paths (e.g., second storage protocol path 512) using the NVMe protocol. As is known in the art, NVMe or NVM Express® is a specification defining how host software communicates with non-volatile memory across a PCI Express® (PCIe®) bus.

For example, suppose a storage volume (e.g., volume 500) is being accessed in a Linux® Host (e.g., client electronic devices 38, 40, 42, 44) and is currently accessed using a first storage protocol (e.g., first storage protocol 508). As will be discussed in greater detail below and for this example, further suppose that the first storage protocol is Small Computer System Interface (SCSI) protocol. The storage volume (e.g., volume 500) may be coupled to a storage processor via a first storage protocol path (e.g., first storage protocol path 510). In this example, the first storage protocol path (e.g., first storage protocol path 510) between the storage processor (e.g., storage processor 100) and the storage volume (e.g., volume 500) may be e.g., /dev/sda. Further suppose that the storage volume (e.g., volume 500) is accessed by e.g., /dev/mapper/<user_friendly_name> where a user has a file-system on this/dev/mapper/<user_friendly_name>. In this example, the storage volume (e.g., volume 500) may be e.g., /dev/sda and the Linux® kernel mapping for this storage volume (e.g., volume 500) may be e.g., /dev/dm-1. Additionally, the Linux® kernel mapping for volume 500 (e.g., /dev/dm-1) may be the device behind e.g., /dev/mapper/<user_friendly_name>. While an example of a first storage protocol path for SCSI for volume 500 (e.g., /dev/sda) has been provided, it will be appreciated that any storage protocol path (i.e., other than SCSI) may be used within the scope of the present disclosure.

Continuing with the above example, further suppose that the storage volume (e.g., volume 500) is also accessed using one or more second storage protocol paths (e.g., second storage protocol paths 512) of a second storage protocol (e.g., second storage protocol 514). In this example, the second storage protocol path (e.g., second storage protocol path 512) between the storage processor (e.g., storage processor 100) and the storage volume (e.g., volume 500) may be e.g., /dev/nvme0n1. That is, the second storage protocol path (e.g., /dev/nvme0n1) may be the NVMe storage protocol reference for volume 500. While an example of a second storage protocol path for NVMe (e.g., /dev/nvme0n1) has been provided, it will be appreciated that any storage protocol path (i.e., other than NVMe) may be used within the scope of the present disclosure.

In some implementations, storage protocol conversion process 10 may associate 402, for each of the one or more selected target volumes, a first storage protocol identifier specific to each selected target volume with a second storage protocol identifier specific to each selected target volume. In some implementations, a second storage protocol identifier may generally include a unique identifier for a particular volume within the second storage protocol. Returning to the above example, suppose a storage volume (e.g., volume 500) is accessible or visible via a second storage protocol path (e.g., second storage protocol path 512). In this example, the second storage protocol path may be e.g., /dev/nvme0n1. As will be discussed in greater detail below, the second storage protocol path (i.e., /dev/nvme0n1) may be a storage protocol path of a second storage protocol (e.g., NVMe) and the second storage protocol identifier may include a NVMe namespace. As is known in the art, a NVMe namespace may generally include a unique identifier for a particular quantity of non-volatile memory (NVM) that may be formatted into logical blocks. In some implementations, second storage protocol identifiers (e.g., NVMe namespaces) may be specific to a particular volume (e.g., volume 500). While an example of NVMe namespace has been provided for the second storage protocol identifier, it will be appreciated that other identifiers may be used within the scope of the present disclosure.

In some implementations, storage protocol conversion process 10 may expose second storage protocol paths to a host non-disruptively by using the NVMe Asynchronous event mechanism (e.g., event type Notice (02h)). For example, this event mechanism may cause the host (e.g., storage processor 100) to send an identify command and get exposed to any new/changed NVMe path(s) (e.g., second storage protocol path 512) and namespace devices (e.g., NVMe reference for volume 500). In this example, because the volume is the same (e.g., first storage protocol identifier and second storage protocol identifier reference the same target volume), any new NVMe path exposed by storage protocol conversion process 10 may inherit the target volume's asymmetric namespace access (ANA) state (equivalent to its SCSI Asymmetric Logical Unit Access (ALUA) state), no special handling may be required to expose the second storage protocol paths.

In some implementations, associating 402, for each of the one or more selected target volumes, a first storage protocol identifier specific to each selected target volume with a second storage protocol identifier specific to each selected target volume may include performing 408 a NVMe set feature command on each second storage protocol identifier specific to each selected target volume. In some implementations, a first storage protocol identifier may generally include a unique identifier for a particular volume within the first storage protocol. One example of a first storage protocol identifier may include, but is not limited to, a SCSI Vital Product Data (VPD) Page-83 Identifier. As is known in the art, a SCSI VPD Page-83 Identifier may generally include one or more identification descriptors for a logical unit (e.g., a target volume). While a SCSI VPD Page-83 Identifier has been discussed, it will be appreciated that any first storage protocol identifier may be used within the scope of the present disclosure. In some implementations, the first storage protocol identifier may be automatically generated for a target volume and/or may be manually defined by a user (e.g., via a user interface).

Referring again to the example of FIG. 5 and in some implementations, suppose a first storage protocol identifier (e.g., a SCSI VPD Page-83 Identifier) is defined for volume 500 within the first storage protocol. Further suppose a second storage protocol identifier (e.g., a NVMe namespace) is defined for volume 500 within the second storage protocol. In this example, storage protocol conversion process 10 may perform 408 a NVMe set command on each second storage protocol identifier specific to each selected target volume. As is known in the art, an NVMe set command may generally include a command defined by the NVMe standard that sets or defines a particular feature or feature value of an NVMe object (e.g., volume 500). In this example, storage protocol conversion process 10 may perform 408 an NVMe set command to associate 402 a first storage protocol identifier for volume 500 (e.g., a SCSI VPD Page-83 Identifier) specific to volume 500 with a second storage protocol identifier (e.g., a NVMe namespace) specific to volume 500. An example of the NVMe set command may include: "nvme set-feature /dev/nvme0n1-f 0xc0-- value=3514f0c53fe600027". However, it will be appreciated that various commands may be used to associate 402 a first storage protocol identifier specific to the target volume with a second storage protocol identifier specific to the target volume within the scope of the present disclosure. As will be discussed in greater detail below, when storage system firmware is not configured to support a storage protocol conversion from a first storage protocol (e.g., SCSI) to a second storage protocol (e.g., NVMe) on its own, storage protocol conversion process 10 may perform 408 NVMe set commands and NVMe get commands to associate the first storage protocol identifier with the second protocol, to group the first storage protocol paths and the second storage protocol paths, and to switch access from the first storage protocol paths to the second storage protocol paths.

In some implementations, storage protocol conversion process 10 may associate 402 a first storage protocol identifier specific to each selected target volume with a second storage protocol identifier specific to each selected target volume without NVMe set commands by sharing or providing the first storage protocol identifier to a predefined vendor unique location. For example, this location can vary per product (e.g., an organization unique identifier (OUI) specific offset) and this offset can be shared with a host. In some implementations, when storage system firmware is configured to support a storage protocol conversion from a first storage protocol (e.g., SCSI) to a second storage protocol (e.g., NVMe) on its own without NVMe set and/or get commands, storage protocol conversion process 10 may provide the first storage protocol identifier to the predefined vendor unique location.

For example, suppose a first storage protocol identifier (e.g., a SCSI VPD Page-83 Identifier) is defined for volume 500 within the first storage protocol. Further suppose a second storage protocol identifier (e.g., a NVMe namespace) is defined for volume 500 within the second storage protocol. Instead of performing 308 an NVMe set command, storage protocol conversion process 10 may associate 402 the first storage protocol identifier (e.g., the SCSI VPD Page-83 Identifier specific to volume 500) with the second storage protocol identifier (e.g., the NVMe namespace for volume 500) by providing the first storage protocol identifier (e.g., the SCSI VPD Page-83 Identifier specific to volume 500) to a predefined vendor unique location. In this manner and as will be discussed in greater detail below, storage protocol conversion process 10 may associate 402 a first storage protocol identifier specific to each selected target volume with a second storage protocol identifier specific to each selected target volume without NVMe set commands.

In some implementations, storage protocol conversion process 10 may associate 402 a first storage protocol identifier specific to each selected target volume with a second storage protocol identifier specific to each selected target volume via a host plug-in (e.g., host plug-in 516) or via an orchestrator running inside data array 112.

In some implementations, storage protocol conversion process 10 may group 404 the one or more first storage protocol paths and the one or more second storage protocol paths into a multipath group based upon, at least in part, the association between the first storage protocol identifier and the second storage protocol identifier. As will be discussed in greater detail below and in some implementations, a multipath group (e.g., multipath group 518) may generally include a plurality of storage protocol paths capable of allowing a host to access a particular target volume (e.g., volume 500).

In some implementations, grouping 404 the one or more first storage protocol paths and the one or more second storage protocol paths into a multipath group based upon, at least in part, the association between the first storage protocol identifier and the second storage protocol identifier may include performing 410 a NVMe get feature command on each second storage protocol identifier visible to the one or more computing devices. As is known in the art, an NVMe get command may generally include a command defined by the NVMe standard that gets or requests a particular feature or feature value of an NVMe object (e.g., NVMe reference for volume 500). For example, storage protocol conversion process 10 may, for each second storage protocol identifier (e.g., each NVMe namespace device) which is visible on the host, perform 410 a NVMe 'get-feature' command.

In some implementations, grouping 404 the one or more first storage protocol paths and the one or more second storage protocol paths into a multipath group based upon, at least in part, the association between the first storage protocol identifier and the second storage protocol identifier may include determining 412 whether each second storage protocol identifier visible to the one or more computing devices is associated with a first storage protocol identifier. For example, storage protocol conversion process 10 may, for each second storage protocol identifier (e.g., each NVMe namespace device) which is visible on the host, perform 410 a 'get-feature' to check if there are any first storage protocol identifiers (e.g., SCSI VPD Page-83 identifiers) associated with the second storage protocol identifier. If no association is found, then this device referenced by the second storage protocol identifier may be treated as a regular second storage protocol device (e.g., a NVMe device). However, if storage protocol conversion process 10 determines 412 that an association is found and the 'get-feature' returns a specific first storage protocol identifier (e.g., SCSI VPD 83 identifier), storage protocol conversion process 10 may determine 412 whether this second storage protocol identifier (e.g., NVMe device) is already part of any multipath group. If the second storage protocol identifier is already part of a multipath group, storage protocol conversion process 10 may proceed to another second storage protocol identifier.

In some implementations, grouping 404 the one or more first storage protocol paths and the one or more second storage protocol paths into a multipath group based upon, at least in part, the first storage protocol identifier and the second storage protocol identifier may include grouping 414 the selected one or more target volumes into the multipath group in response to determining 412 that the first storage protocol identifier specific to each selected target volume is associated with the second storage protocol identifier specific to each selected target volume. If the second storage protocol identifier (e.g., NVMe namespace device) is not part of any multipath group, storage protocol conversion process 10 may add the second storage protocol path to the multipath group that represents the same volume (e.g., based on the first storage protocol identifier (e.g., SCSI VPD Page-83 identity)).

Referring again to the example of FIG. 5 and in some implementations, storage protocol conversion process 10 may determine 412 that the second storage protocol identifier for volume 500 is associated with a first protocol identifier for the same volume (e.g., volume 500). In this example, storage protocol conversion process 10 may group 414 this second storage protocol path (e.g., /dev/nvme0n1) with the first storage protocol path (e.g., /dev/mapper/<user_friendly_name>) as multiple paths from the host to volume 500 rather than defining the second storage protocol identifier as a separate NVMe namespace device. As will be discussed in greater detail below, by grouping 414 the first storage protocol path and the second storage protocol path in a multipath group, storage protocol conversion process 10 may avoid any host IO disruption and/or any application reconfiguration when converting or switching between storage protocols.

In some implementations, grouping 404 the one or more first storage protocol paths and the one or more second storage protocol paths into a multipath group based upon, at least in part, the first storage protocol identifier and the second storage protocol identifier may include performing 416, on each second storage protocol identifier, a NVMe identify command configured to return the first storage protocol identifier specific to each selected target volume. In some implementations, storage protocol conversion process 10 may perform 416 an NVMe identify command on each second storage protocol identifier instead of performing 410 an NVMe get feature command as discussed above. In this manner, a data array (e.g., data array 112) may be configured by storage protocol conversion process 10 to voluntarily return the corresponding first storage protocol identifier (e.g., the SCSI VPD-83 NAA identifier) in response to a NVMe identify command. In some implementations, the host may then obtain the first storage protocol identifier from a predefined vendor unique location (as discussed above) to determine 412 that that the first storage protocol identifier specific to each selected target volume is associated with the second storage protocol identifier specific to each selected target volume and group 414 the first storage protocol path and the second storage protocol path into a multipath group.

In some implementations, storage protocol conversion process 10 may switch 406 access between the one or more computing devices and the one or more selected target volumes from the one or more first storage protocol paths to the one or more second storage protocol paths. Referring again to the example of FIG. 5 and in some implementations, storage protocol conversion process 10 may switch 406 access between the one or more computing devices (e.g., one or more hosts) and the one or more selected target volumes (e.g., volume 500) from the one or more first storage protocol paths (e.g., first storage protocol paths 510) to the one or more second storage protocol paths (e.g., second storage protocol paths 512).

In some implementations, switching 406 access may include running a suspend operation or command on a target volume (e.g., volume 500) which temporarily suspends input-output (IO) operations on the target volume. Storage protocol conversion process 10 may (e.g., by running dmsetup in Linux®) load or reload a second storage protocol path to replace the first storage protocol path. Storage protocol conversion process 10 may run or execute a resume operation on the target volume (e.g., volume 500).

In some implementations, switching 406 access may include adding the one or more second storage protocol paths as additional paths and setting the one or more second storage protocol paths to stand-by. In some implementations, stand-by paths may not be used until there is a need (e.g., failure of a primary path) or a manual trigger to switch to stand-by paths. In some implementations, a multipath I/O (MPIO) concept such as failover may be used, to indicate that the one or more second storage protocol paths are stand-by paths that will be used only when the one or more primary paths (e.g., first storage protocol paths) are down or have failed. In response to setting the one or more second storage protocol paths as stand-by paths, storage protocol conversion process 10 may remove the one or more first storage protocol paths from the multipath group of storage protocol paths and/or the host-mapping thus forcing the stand-by/failover paths (e.g., the one or more second storage protocol paths) to be used.

While examples of how storage protocol conversion process 10 may switch 406 access have been provided, it will be appreciated that following or in response to grouping 404 the one or more first storage protocol paths and the one or more second storage protocol paths into a multipath group, storage protocol conversion process 10 may switch 406 access via more than one implementation method. Accordingly, storage protocol conversion process 10 may allow for non-disruptive switching 406 of access between a host and a target volume without any need for any application reconfiguration.

In some implementations, process may migrate 418 data from the one or more selected target volumes to one or more destination volumes that are accessible to the one or more computing devices via the one or more second storage protocol paths. Referring also to the example of FIG. 6 and in some implementations, a host (e.g., storage processor 100) may be configured to access a target volume (e.g., volume 500) via one or more first storage protocol paths (e.g., first storage protocol path 510) via a first storage protocol (e.g., first storage protocol 508). In this example, a user may upgrade or otherwise desire to move the contents of a target volume to a destination volume (e.g., volume 600) that may be accessible via one or more second storage protocol paths (e.g., second storage protocol path 512) of a second storage protocol (e.g., second storage protocol 514).

Accordingly, in this example, storage protocol conversion process 10 may migrate 418 data from one or more selected target volumes (e.g., volume 500) accessible to the storage processor (e.g., storage processor 100) via one or more first storage protocol paths (e.g., first storage protocol path 510) via the first storage protocol (e.g., first storage protocol 508) to one or more destination volumes (e.g., volume 600) that are accessible to the storage processor (e.g., storage processor 100) via one or more one or more second storage protocol paths (e.g., second storage protocol path 512) of the second storage protocol (e.g., second storage protocol 514). In some implementations, the one or more selected target volumes may be in the same data array as the one or more destination volumes or may be in a different data array from the one or more destination volumes.

In some implementations, storage protocol conversion process 10 may migrate 418 the data from the one or more selected target volumes to the one or more destination volumes before and/or while grouping 404 the one or more first storage protocol paths and the one or more second storage protocol paths into a multipath group. For example and in some implementations, storage protocol conversion process 10 may migrate 418 the data from the one or more selected target volumes to the one or more destination volumes via snapshots. As is known in the art, a snapshot is a representation of a state of a target volume at a particular point in time. In some implementations, migrating 418 the data may include generating a snapshot of the target volume (e.g., volume 500) and copying the snapshot to the destination volume (e.g., volume 600). Process may migrate 418 the data of the target volume by continuing to generate and copy snapshots of the target volume to the destination volume without disturbing application IO requests.

In some implementations, migrating 418 the data may utilize a thin-import process. As is known in the art, thin-import process may generally include the following actions: when a read request is received at the destination volume and if data is unavailable at the destination volume during migration, storage protocol conversion process 10 may do a remote fetch of the requested data from the target volume. Thin-importing may also include performing a background copy of the data from the target volume to the destination volume. In some implementations, the snap-diff API may be leveraged to copy only what data and/or snapshots are required. In some implementations, when a host write IO request is received at the destination volume during migration, the write IO request may be mirrored to the target volume and the host write IO request may be successfully acknowledged only when both the write operations succeed (i.e., one write operation on the target volume and one write operation on the source volume). In some implementations, when a host write IO request is writing to data involved in a background copy operation, storage protocol conversion process 10 may give execution priority to the host write IO over any background copy operation(s). Accordingly, thin-importing may ensure that the final contents of the target volume are copied to destination volume successfully.

In some implementations, switching 406 access between the one or more computing devices and the one or more selected target volumes from the one or more first storage protocol paths to the one or more second storage protocol paths may include switching 420 access between the one or more computing devices and the one or more selected target volumes via the one or more first storage protocol paths to access between the one or more computing devices and the one or more destination volumes via the one or more second storage protocol paths. For example, once a predetermined number of snapshots are copied from the selected target volume (e.g., volume 500) to the destination volume (e.g., volume 600), storage protocol conversion process 10 may setup a thin-import process on the destination volume (e.g., volume 600), which may start a background copy and ensure that write IO requests are sent to both the destination volume (e.g., volume 600) and the source volume (e.g., volume 500).

As discussed above regarding FIG. 5, switching 420 access between the one or more computing devices and the one or more selected target volumes via the one or more first storage protocol paths to access between the one or more computing devices and the one or more destination volumes via the one or more second storage protocol paths may include temporarily suspending host application IO requests on the target volume and the destination volume. Storage protocol conversion process 10 may (e.g., by running dmsetup in Linux®) load or reload a second storage protocol path to replace the first storage protocol path. Storage protocol conversion process 10 may then run or execute a resume operation on the destination volume (e.g., volume 600). In this example, a thin-import process setup on the destination volume (e.g., volume 600) may complete the final copy of the remaining contents from the source volume (e.g., volume 500), as a result of the background copy operation. In addition and as discussed above, storage protocol conversion process 10 may allow the destination volume (e.g., volume 600) to respond to read IO requests of non-available data by doing a remote read from the source volume (e.g., volume 500).

In some implementations and as discussed above, switching 420 access may include adding the one or more second storage protocol paths as additional paths and setting the one or more second storage protocol paths to stand-by. In some implementations, stand-by paths may not be used until there is a need or a manual trigger to switch to stand-by paths. In some implementations, a multipath I/O (MPIO) concept such as failover may be used, to indicate that the one or more second storage protocol paths are stand-by paths that will be used only when the one or more primary paths (e.g., first storage protocol paths) are down. In response to setting the one or more second storage protocol paths as stand-by paths, storage protocol conversion process 10 may remove the one or more first storage protocol paths from the group of storage protocol paths and/or the host-mapping thus forcing the stand-by/failover paths (e.g., the one or more second storage protocol paths) to be used.

In this manner, storage protocol conversion process 10 may ensure that the host application remains online (i.e., the file-system remains mounted), that there is no application down-time, and that there is no need for application configuration when migrating data and converting the storage protocol.

In some implementations, while the above discussion has included examples of a single host (e.g., a single storage processor), storage protocol conversion process 10 may be readily extended to multiple hosts in a cluster configuration (e.g., a SCSI-3 Persistent Reserve (PR) based host cluster). In such configurations, storage protocol conversion process 10 may map the host registrations and reservations of a first storage protocol (e.g., SCSI-3 PR registrations) to second storage protocol equivalents (e.g., NVMe) while grouping 404 the one or more first storage protocol paths and the one or more second storage protocol paths into a multipath group based upon, at least in part, the association between the first storage protocol identifier and the second storage protocol identifier. In some implementations, this process may be completed across all the host nodes in the cluster and the switching 406 of storage protocol paths may also be coordinated among the multiple host nodes of a cluster.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   selecting, via the computing device, one or more target volumes within a storage system that are currently accessible to one or more computing devices via one or more first storage protocol paths via a first storage protocol for accessing via one or more second storage protocol paths via a second storage protocol, wherein the first storage protocol is Small Computer System Interface (SCSI) and the second storage protocol is Non-Volatile Memory Express (NVMe);
   associating, for each of the one or more selected target volumes, a first storage protocol identifier specific to each selected target volume with a second storage protocol identifier specific to each selected target volume, wherein the first storage protocol identifier is a SCSI identifier specific to each selected target volume and the second storage protocol identifier is a NVMe Namespace specific to each selected target volume, wherein associating, for each of the one or more selected target volumes, a first storage protocol identifier specific to each selected target volume with a second storage protocol identifier specific to each selected target volume includes performing a NVMe set feature command on each second storage protocol identifier specific to each selected target volume to associate the first storage protocol identifier with the second storage protocol identifier specific to each selected target volume;

grouping the one or more first storage protocol paths and the one or more second storage protocol paths into a multipath group based upon, at least in part, the association between the first storage protocol identifier and the second storage protocol identifier; and switching access between the one or more computing devices and the one or more selected target volumes from the one or more first storage protocol paths to the one or more second storage protocol paths.

2. The computer-implemented method of claim 1, grouping the one or more first storage protocol paths and the one or more second storage protocol paths into a multipath group based upon, at least in part, the association between the first storage protocol identifier and the second storage protocol identifier includes:

performing a NVMe get feature command on each second storage protocol identifier visible to the one or more computing devices;

determining whether each second storage protocol identifier visible to the one or more computing devices is associated with a first storage protocol identifier; and grouping the one or more first storage protocol paths and the one or more second storage protocol paths into the multipath group in response to determining that the first storage protocol identifier specific to each selected target volume is associated with the second storage protocol identifier specific to each selected target volume.

3. The computer-implemented method of claim 1, wherein grouping the one or more first storage protocol paths and the one or more second storage protocol paths into a multipath group based upon, at least in part, the association between the first storage protocol identifier and the second storage protocol identifier includes performing, on each second storage protocol identifier, a NVMe identify command configured to return the first storage protocol identifier specific to each selected target volume.

4. The computer-implemented method of claim 1, further comprising:

migrating data from the one or more selected target volumes to one or more destination volumes that are accessible to the one or more computing devices via the one or more second storage protocol paths.

5. The computer-implemented method of claim 4, wherein switching access between the one or more computing devices and the one or more selected target volumes from the one or more first storage protocol paths to the one or more second storage protocol paths includes switching access between the one or more computing devices and the one or more selected target volumes via the one or more first storage protocol paths to access between the one or more computing devices and the one or more destination volumes via the one or more second storage protocol paths.

6. A computer program product residing on a non-transitory computer readable medium having a plurality of instructions stored thereon which, when executed by a processor, cause the processor to perform operations comprising:

selecting, via the computing device, one or more target volumes within a storage system that are currently accessible to one or more computing devices via one or more first storage protocol paths via a first storage protocol for accessing via one or more second storage protocol paths via a second storage protocol, wherein the first storage protocol is Small Computer System Interface (SCSI) and the second storage protocol is Non-Volatile Memory Express (NVMe);

associating, for each of the one or more selected target volumes, a first storage protocol identifier specific to each selected target volume with a second storage protocol identifier specific to each selected target volume, wherein the first storage protocol identifier is a SCSI identifier specific to each selected target volume and the second storage protocol identifier is a NVMe Namespace specific to each selected target volume, wherein associating, for each of the one or more selected target volumes, a first storage protocol identifier specific to each selected target volume with a second storage protocol identifier specific to each selected target volume includes performing a NVMe set feature command on each second storage protocol identifier specific to each selected target volume to associate the first storage protocol identifier with the second storage protocol identifier specific to each selected target volume;

grouping the one or more first storage protocol paths and the one or more second storage protocol paths into a multipath group based upon, at least in part, the association between the first storage protocol identifier and the second storage protocol identifier; and switching access between the one or more computing devices and the one or more selected target volumes from the one or more first storage protocol paths to the one or more second storage protocol paths.

7. The computer program product of claim 6, grouping the one or more first storage protocol paths and the one or more second storage protocol paths into a multipath group based upon, at least in part, the association between the first storage protocol identifier and the second storage protocol identifier includes:

performing a NVMe get feature command on each second storage protocol identifier visible to the one or more computing devices;

determining whether each second storage protocol identifier visible to the one or more computing devices is associated with a first storage protocol identifier; and grouping the one or more first storage protocol paths and the one or more second storage protocol paths into the multipath group in response to determining that the first storage protocol identifier specific to each selected target volume is associated with the second storage protocol identifier specific to each selected target volume.

8. The computer program product of claim 6, wherein grouping the one or more first storage protocol paths and the one or more second storage protocol paths into a multipath group based upon, at least in part, the association between the first storage protocol identifier and the second storage protocol identifier includes performing, on each second storage protocol identifier, a NVMe identify command configured to return the first storage protocol identifier specific to each selected target volume.

9. The computer program product of claim 6, wherein the operations further comprise:

migrating data from the one or more selected target volumes to one or more destination volumes that are accessible to the one or more computing devices via the one or more second storage protocol paths.

10. The computer program product of claim 9, wherein switching access between the one or more computing devices and the one or more selected target volumes from the one or more first storage protocol paths to the one or more second storage protocol paths includes switching access between the one or more computing devices and the one or more selected target volumes via the one or more first storage protocol paths to access between the one or more computing devices and the one or more destination volumes via the one or more second storage protocol paths.

11. A computing system comprising:
a memory; and
a processor configured to select one or more target volumes within a storage system that are currently accessible to one or more computing devices via one or more first storage protocol paths via a first storage protocol for accessing via one or more second storage protocol paths via a second storage protocol, wherein the first storage protocol is Small Computer System Interface (SCSI) and the second storage protocol is Non-Volatile Memory Express (NVMe), wherein the processor is further configured to associate, for each of the one or more selected target volumes, a first storage protocol identifier specific to each selected target volume with a second storage protocol identifier specific to each selected target volume, wherein the first storage protocol identifier is a SCSI identifier specific to each selected target volume and the second storage protocol identifier is a NVMe Namespace specific to each selected target volume, wherein associating, for each of the one or more selected target volumes, a first storage protocol identifier specific to each selected target volume with a second storage protocol identifier specific to each selected target volume includes performing a NVMe set feature command on each second storage protocol identifier specific to each selected target volume to associate the first storage protocol identifier with the second storage protocol identifier specific to each selected target volume, wherein the processor is further configured to group the one or more first storage protocol paths and the one or more second storage protocol paths into a multipath group based upon, at least in part, the association between the first storage protocol identifier and the second storage protocol identifier, and wherein the processor is further configured to switch access between the one or more computing devices and the one or more selected target volumes from the one or more first storage protocol paths to the one or more second storage protocol paths.

12. The computing system of claim 11, grouping the one or more first storage protocol paths and the one or more second storage protocol paths into a multipath group based upon, at least in part, the association between the first storage protocol identifier and the second storage protocol identifier includes:
performing a NVMe get feature command on each second storage protocol identifier visible to the one or more computing devices;
determining whether each second storage protocol identifier visible to the one or more computing devices is associated with a first storage protocol identifier; and
grouping the one or more first storage protocol paths and the one or more second storage protocol paths into the multipath group in response to determining that the first storage protocol identifier specific to each selected target volume is associated with the second storage protocol identifier specific to each selected target volume.

13. The computing system of claim 11, wherein grouping the one or more first storage protocol paths and the one or more second storage protocol paths into a multipath group based upon, at least in part, the association between the first storage protocol identifier and the second storage protocol identifier includes performing, on each second storage protocol identifier, a NVMe identify command configured to return the first storage protocol identifier specific to each selected target volume.

14. The computing system of claim 11, wherein the at least one processor is further configured to:
migrate data from the one or more selected target volumes to one or more destination volumes that are accessible to the one or more computing devices via the one or more second storage protocol paths.

15. The computer-implemented method of claim 1, wherein the SCSI identifier is a SCSI Vital Product Data (VPD) Page-83 Identifier.

* * * * *